Patented Sept. 30, 1930

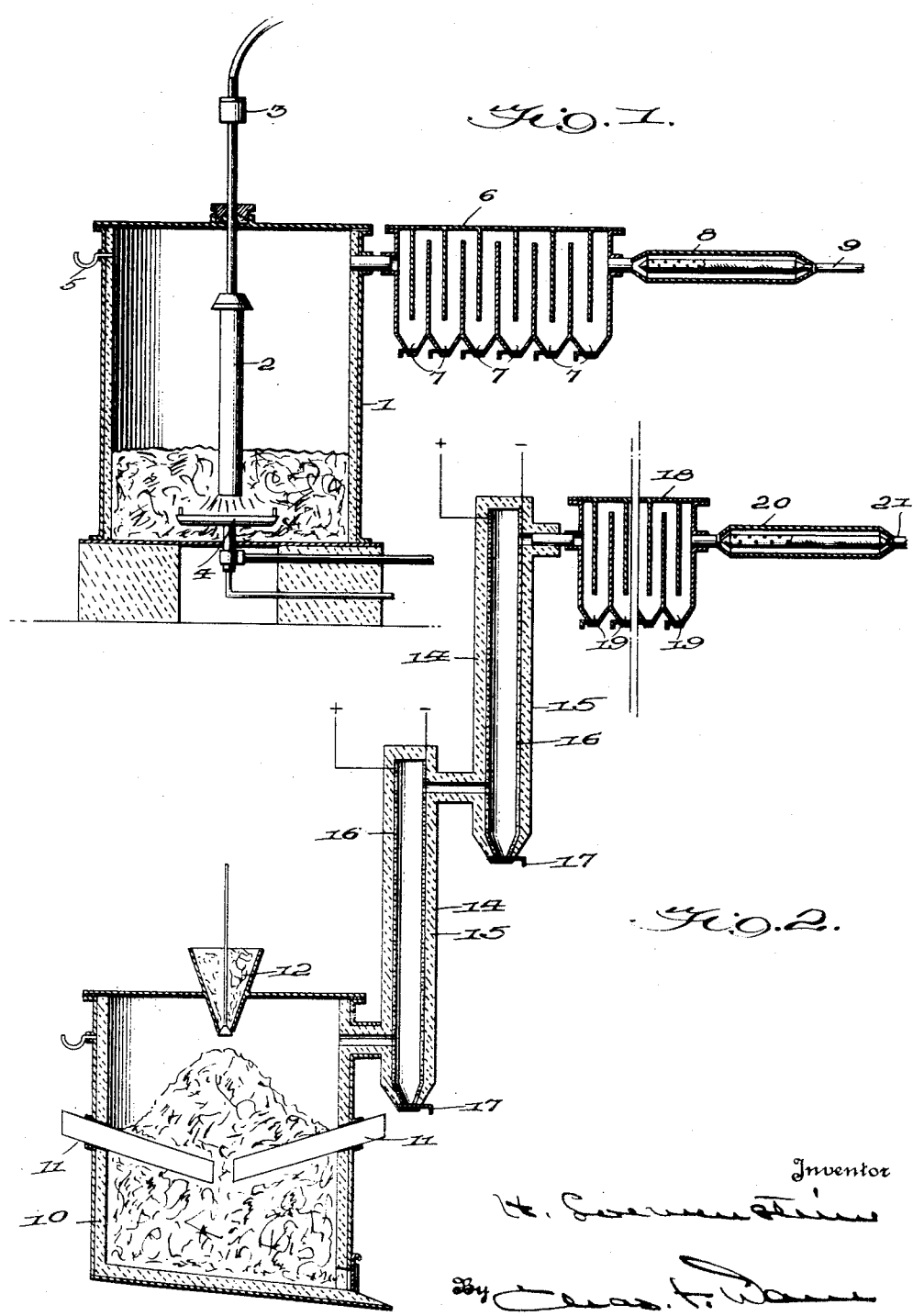

1,777,267

UNITED STATES PATENT OFFICE

HIRSCH LOEWENSTEIN, OF KARLSRUHE IN BADEN, GERMANY

METHOD OF RECOVERING SOLUBLE BERYLLIUM COMPOUNDS

Application filed September 18, 1929, Serial No. 393,450, and in Germany September 25, 1928.

The invention relates to a novel method of recovering beryllium in the form of soluble compounds, such as oxide or sulfide of metal from beryllium containing materials or natural minerals such as beryl, phenacite and the like, said method involving the heat treatment of the raw material in admixture with a reducing agent, preferably sulfur or a sulfur containing compound, under conditions that will result in the production of the readily available compounds of the metal, which are concurrently volatilized and subsequently condensed.

Beryllium occurs in beryl, phenacite and similar minerals accompanied by silicates of aluminum, iron and other metals. It is a desideratum in the art to recover beryllium in available form from these silicates, the recovered material being as pure as may be. In the present invention this object is attained by subjecting the silicate to a high temperature under reducing conditions and usually in the presence of sulfur; the temperature being high enough to form and vaporize volatile beryllium compounds (oxide and sulfide). The reduction is usually sufficient to reduce the iron oxide and silica present, thereby forming a ferrosilicon but is not sufficient to produce metallic aluminum or metallic beryllium. In the event of the presence of sulfur, however, reduction can go somewhat further in order to form sulfides of beryllium and aluminum. An admixture of iron pyrite with the charge assists reduction and gives sulfur and iron to form ferrosilicon with reduced silica. An electric furnace is ordinarily used. The vapors may contain beryllium oxide or sulfide or both and aluminum oxide or sulfide or both. Generally, the vapors evolved are submitted to fractional condensation to separate alumina and beryllia to a certain extent. The beryllium compounds are more volatile than the aluminum compounds and condense later.

Suitable forms of apparatus for carrying out the method are more or less diagrammatically illustrated in the accompanying drawings, in which:

Fig. 1 is a sectional elevation of an electric furnace and associated condensing and separating apparatus.

Fig. 2 is a similar view of another type of electric furnace with ancillary fractional condensers interposed between the furnace and the condensing and separating apparatus.

In carrying out the method the material containing beryllium is preferably mixed with sulfur or sulfur compounds, such for example, as pyrites or ferrous sulfide and a reducing agent, such as carbon. A reducing gas must be used. Sulfur in a free state or in the form of hydrogen sulfide, may serve as a reducing agent, as may also other related reduction agents, such as calcium carbide or silicon. Preferably, when sulfur is employed it should be in sufficient quantity to insure that all of the aluminum and beryllium present in the raw material may combine therewith. The mixture is then heated, preferably in the presence of neutral gases in an electric furnace, which may be of any of the usual types, such as an arc furnace or an induction furnace, to a temperature sufficient to effect the reduction of the beryllium to the form of oxide or sulfide, which temperature is also sufficient to volatilize the beryllium compound and possibly part of the aluminum compound, the volatilization being enhanced by carrying out the operation under reduced pressure or partial vacuum within the furnace. Inasmuch as the resulting beryllium compound is volatilized at a lower temperature than the aluminum compounds, it is possible, by carefully regulating the temperature, to secure a substantially complete volatilization of the desired beryllium compounds with a relatively small portion of volatilized aluminum compounds which subsequently may be readily separated. The volatile constituents of the reaction are then led from the furnace to the condensing and separating apparatus or, if found necessary, the fumes may be first led through a separating device which will extract all of the solid material therefrom and thence through special forms of fractional condensers which operate to maintain the beryllium compounds in gaseous condition, while permitting the concurrently formed aluminum compounds to condense and separate therefrom, the gaseous beryllium compounds then being passed through suitable condensers and separators, whence said compounds may be recovered for subsequent use.

Similarly a fractional condenser may be employed into which the admixed fumes from the furnace are delivered, the temperatures of the various sections of the condenser being so regulated as to first condense the undesired vapors and, finally, to condense and throw down the desired beryllium compound or compounds in the form of oxide or sulfide, or both.

If found more expedient the separation of the sublimates may be effected after the condensing operation, by any suitable means or treatment.

In Fig. 1 of the drawings a relatively simple form of apparatus for carrying out the method is illustrated, said apparatus comprising an electric furnace comprising a casing 1, preferably provided with a refractory lining, in the top of which is slidably mounted the support for the movable electrode 2, which cooperates with a fixed electrode 4, preferably in the form of a carbon plate mounted near the bottom of the furnace, and which may be cooled by suitable water circulating means, the upper or movable electrode being controlled and maintained in arcing relation with the plate 4 by suitable controlling means diagrammatically indicated at 3. The electrodes and their supports are suitably insulated, and are mounted in the furnace in air-tight relation so that the interior of the furnace may be maintained at sub-atmospheric pressure or partial vacuum, which will be indicated by a manometer 5.

The mixture of the raw beryllium materials and the reducing agent is charged into the furnace between the electrodes, and the arc between the latter serves to raise the temperature of the ingredients of the mixture to effect the formation from the raw beryllium containing materials of beryllium oxide or sulfide, or both, according to the character of the reagents admixed with the raw beryllium materials, and also to vaporize the stated beryllium compounds together with some of the resultant aluminum compounds. Iron oxide and silica are reduced and form ferrosilicon. The vapors pass off through the discharge opening at the top of the furnace into a condenser and separator 6, which may be of the well known zigzag type, in which major portions of the volatilized mineral values are successively condensed and are collected in the hopper like bottom sections of the apparatus 6, from which they may be discharged by suitable gated outlets 7 in the hopper bottoms. The temperature in the condenser may be so regulated that the aluminum compounds will be separated in the first portion of the condenser, while most of the volatile beryllium compounds will be condensed in the following sections of the condenser. From the condenser 6, the residual gaseous constituents are passed through a bag filter 8, of usual construction, which will separate the permanent gases from any entrained beryllium compound entrained therewith.

In the apparatus illustrated in Fig. 2, the electric furnace comprises a suitable chamber 10, with arc electrodes 11 passing through the sides thereof and provided with the usual regulating apparatus, not shown, the electrodes being so disposed that the arc plays directly into the body of the mixture which is fed intermittently as desired into the furnace from a suitable valved hopper 12. Connected to the outlet of the furnace is one or more vertical columns 14, preferably formed of refractory material and provided with a lining 15 of carbon, which is adapted to be heated by a suitable electric resistance apparatus 16 associated therewith, the temperature generated in the linings being so regulated as to maintain the beryllium reaction products in gaseous condition while passing therethrough, but insufficient to maintain the fumes of the aluminum or other foreign reaction products produced, so that the latter are condensed and fall to the bottom of the columns, whence they may be discharged from time to time by means of suitable gates 17. These columns constitute fractional condensers which are effective in separating the fumes of the beryllium compounds from all foreign materials which are less volatile than said compounds, so that when the beryllium compound fumes eventually pass through the condenser 18 and the bag filter 20, said compounds will be condensed in the form of substantially pure sublimate, which latter may be discharged from the hopper bottoms of the several sections of the condenser by the gate valves 19.

As a particular example of the operation of the method carried out in the apparatus illustrated in Fig. 1, 1 kg. of beryl was mixed with 2½ kg. of pyrites and 100 gr. of carbon. This particular amount of carbon was employed for the purpose of reducing the entire content of iron and silicon present, but was not sufficient to effect reduction of the aluminum or beryllium. The furnace was heated for 4 hours with a current of 200 amp. 40 to 60 volts and under an internal pressure within the furnace of 720 mm., which was maintained by the pump attached to the end of the bag filter. When the operation was completed and the furnace had been permitted to cool, there was found at the bottom an alloy of ferrosilicon covered with slag, in which only traces of beryllium could be found. The sublimation products were largely recovered in the condenser or dust chamber 6, and consisted of the soluble beryllium compounds desired, together with a small portion of carbon, iron and aluminum as impurities, most of which latter being deposited in the first sections of the condenser or dust chamber, so that it was found that the forward sections of the condenser contained practically all of the impurities with not more than 40% of the soluble beryllium compounds, while in the following and final chambers of the condenser or dust chamber, substantially pure beryllium compounds of the character desired were recovered.

What I claim is:

1. The method of treating beryllium containing silicate minerals, which comprises mixing the raw materials with a reducing agent, heating the mixture to effect reduction of the silica to silicon and a transformation of the beryllium constituents into available compounds with simultaneous volatilization of such compounds, and production of a residue containing silicon, and condensing the volatilization products.

2. The method of recovering soluble compounds of beryllium from beryllium containing minerals, which comprises sublimating an admixture of the mineral and sulphur.

3. The method of recovering soluble compounds of beryllium from beryllium containing minerals, which comprises heating the mineral in the presence of sulphur to a temperature sufficient to volatilize the resultant reaction compounds of beryllium, and condensing the volatilized products.

4. The method of recovering soluble compounds of beryllium from beryllium containing minerals, which comprises heating the mineral in the presence of a metal sulfide to a temperature sufficient to volatilize the resultant reaction compounds of beryllium, and condensing the volatilized products.

5. The method of recovering soluble compounds of beryllium from beryllium containing minerals, which comprises heating the mineral in the presence of pyrites to a temperature sufficient to volatilize the resultant reaction compounds of beryllium, and condensing the volatilized products.

6. The method of recovering soluble compounds of beryllium from beryllium containing minerals, which comprises heating the mineral in the presence of pyrites and carbon to a temperature sufficient to volatilize the resultant reaction compounds of beryllium, and condensing the volatilized products.

7. In the production of available beryllium compounds from beryl and like minerals, the process which comprises heating such a mineral under reducing conditions to a temperature sufficient to effect reduction of silica to silicon and volatilization of beryllium oxide.

8. In the manufacture of available beryllium compounds from beryl and like minerals, the process which comprises heating a mixture of such a mineral and pyrite in the presence of carbon to a temperature sufficint to form ferrosilicon and vapors containing beryllium oxide or sulfide or both.

9. The method of recovering soluble compounds of beryllium from beryllium-containing silicate minerals, which comprises heating an admixture of the mineral and a reducing agent to sublime a beryllium compound and to form a residue containing silicon, thus separating the beryllium from the silicon.

In testimony whereof I affix my signature.

HIRSCH LOEWENSTEIN.